T. H. RIEDER AND W. B. WIEGAND.
RESILIENT RUBBER COMPOUND MATERIAL.
APPLICATION FILED APR. 25, 1916.
1,305,008.
Patented May 27, 1919.
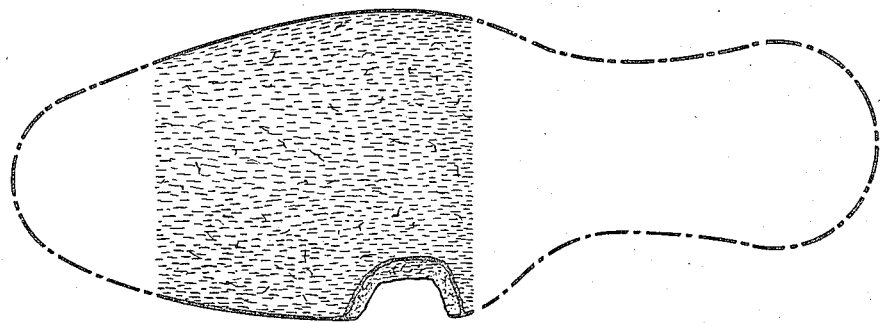
WITNESS:
INVENTORS
Talmon H.Rieder and
William B.Wiegand,
BY
THEIR ATTORNEY

UNITED STATES PATENT OFFICE.

TALMON H. RIEDER AND WILLIAM B. WIEGAND, OF MONTREAL, QUEBEC, CANADA, ASSIGNORS TO THE GOODYEAR'S METALLIC RUBBER SHOE COMPANY, A CORPORATION OF CONNECTICUT.

RESILIENT RUBBER-COMPOUND MATERIAL.

1,305,008.

Specification of Letters Patent. Patented May 27, 1919.

Application filed April 25, 1916. Serial No. 93,360.

*To all whom it may concern:*

Be it known that we, TALMON H. RIEDER and WILLIAM B. WIEGAND, both subjects of the King of Great Britain, residing at Montreal, Province of Quebec, Dominion of Canada, have invented certain new and useful Improvements in Resilient Rubber-Compound Material, of which the following is a full, clear, and exact description.

This invention relates to articles made of resilient material having a non-slipping or gripping surface, and is more particularly directed to rubber soles of this nature.

The principal objects of the invention are to provide an article having such non-slipping characteristics which shall be wear-resistant, shall have a low specific gravity, and which may be cheaply and rapidly manufactured.

Heretofore in order to obtain wear-resistant quality in rubber goods it has been customary to add various materials, preferably pigments or other mineral substances, such as zinc oxid and barytes. Such substances produce compounds with increased tensile strength and resistance to abrasion. They do not, however, provide a non-slipping material and the specific gravity of the product is increased by such addition.

Attempts have been made to lower the cost of the products (and incidentally the specific gravity has been lowered) by the addition of cotton, wood pulp, and similar materials in powdered form, but the resultant materials have been deficient in tensile strength and subject to comparatively rapid wear. Attempts have also been made to incorporate cotton fiber by milling the rubber and fiber together but but they have resulted in a non-uniform and hence weakened mass due to the fact that the fibers spin with one another in the mill, forming threads and these threads appear as aggregates snarled and twisted together in the resulting mass. The incorporation of mineral fibrous material, such as asbestos, has also been carried on but it has been impossible to maintain the fibrous form in the resulting mass due to the fact that the comparatively weak fibers are reduced to powder and broken up by the processes of incorporation. The attempt to incorporate fibers in a solution of rubber with subsequent evaporation of the solvent has resulted in the production of an inferior product, for the rubber partially loses its "life" or resiliency after the evaporation of the solvent and is less able to withstand abrasion.

We have found, however, that a material having a non-slipping surface having high wear-resistance and low specific gravity, and at the same time manufacturable at a low cost may be produced by incorporating certain wool-fibers with rubber. The wool-fiber used is preferably an article known as shear-flock which is a waste product obtained in the manufacture of felt, although in place of or with this material may be substituted or added napper-flock, garnetted upper clips, or similar wool shoddy. The rubber employed may be any one of the various kinds used in the manufacture of soles, etc. An excellent article has been obtained by employing the following ingredients in the quantities mentioned:—

| | |
|---|---|
| Rubber | 20 parts |
| Shear-flock | 10 " |
| Sulfur | 1 " |
| Litharge | 1 " |
| Total | 32 " |

This material is mixed in a rubber grinding-mill and the fibers are thoroughly incorporated throughout the mass; the material so prepared is then passed through calenders and run into sheet form. It may then be shaped into soles or other articles. The articles are then vulcanized. A cure using the above ingredients has been effected in twelve minutes using sixty-five pounds pressure.

The material formed according to the above procedure has a high tensile strength and consequent exceptional resistance to wear. A stress diagram plotted from tests on the material shows that it resembles highly pigmented rubber up to the point on the diagram where decided elongation of the material occurs and from that point on it resembles pure rubber. It thus is seen to combine the tensile strength of pigmented rubber and the elasticity of pure rubber. This high tensile strength may be at least in part explained by the scale-like structure of the wool-fiber, the grip of the scales upon the rubber binder being much firmer than that of the comparatively smooth walls of the cotton fiber. In practice, this bond is evidenced by the ability of articles made up as above to withstand cracking under hard usage.

The incorporation of wool-fiber with rubber in a rubber grinding mill tends in some degree to parallelize the fibers without at the same time forming tangled and twisted masses, such as result when cotton fiber is admixed. This feature is indicated more clearly in the accompanying drawing wherein a sole made up of the material is shown. A large proportion of the fibers lie in a generally parallel position with the longitudinal axis of the sole and thus increase the strength and wearing qualities thereof in this direction. The projecting fibers form a distinctly hairy surface on the sole which has a high coefficient of friction, and which will therefore serve to prevent slipping on ice, wet pavements, etc. A portion of the sole in the drawing is shown as broken away, displaying fibers incorporated substantially uniformly throughout so that as the sole gradually wears away there will always be a new wear-resisting and non-slipping surface presented. It has been observed further in connection with the wearing qualities of the material that it may be subjected to damp for long periods without showing any signs of rotting. This is well in accordance with the characteristics of wool, which is an excellent damp-resisting material.

With regard to cost of manufacture it will be observed that a product which has heretofore been a waste material is employed. The shear-flock and shoddies which we preferably use are at the present time treated as factory scrap, of little or substantially no value.

As a further advantage of the use of such fibers in rubber compounds it is pointed out that a lighter article may be made than when ground cotton is employed. Quantitative tests made upon the addition of these two substances to the rubber show conclusively that the specific gravity of the wool compound is appreciably less.

The comparatively high steam-pressure which may be employed in the vulcanization of the compound permits of a rapid production of the material. Vulcanization at sixty-five pounds pressure may be effected in twelve minutes and the resulting product is in no wise injured by the high heat. It will be observed that this behavior differs decidedly from that of compounds containing cotton which suffer severely when vulcanized at temperatures exceeding those obtained by subjecting the material to forty pounds steam pressure.

Having thus described our invention what we claim as new and desire to protect by Letters Patent is:

1. A sheet of resilient material having a non-slipping hairy surface, consisting of a vulcanized rubber binder and wool-fibers incorporated therein, the proportion of rubber to wool being such that the resulting material possesses the tensile strength and wear-resisting property of vulcanized rubber loaded with zinc oxid and the elasticity of pure rubber.

2. A sheet of resilient material having a non-slipping hairy surface, consisting of a vulcanized rubber binder and wool-fibers incorporated therein in the proportion of approximately two parts of rubber to one of wool-fiber, the resulting material having the tensile strength and wear-resisting property of vulcanized rubber loaded with zinc oxid and the elasticity of pure rubber.

3. A resilient material composed of rubber twenty parts, wool shear-flock ten parts, and a vulcanizing material, the whole being intimately mixed and run into sheet form.

Signed at Montreal, Canada, this 20 day of April, 1916.

TALMON H. RIEDER.
WILLIAM B. WIEGAND.